Oct. 23, 1945.　　　　K. S. CLAPP　　　　2,387,234
FLUID CONTROL VALVE MECHANISM
Filed Jan. 29, 1943　　　　2 Sheets-Sheet 1
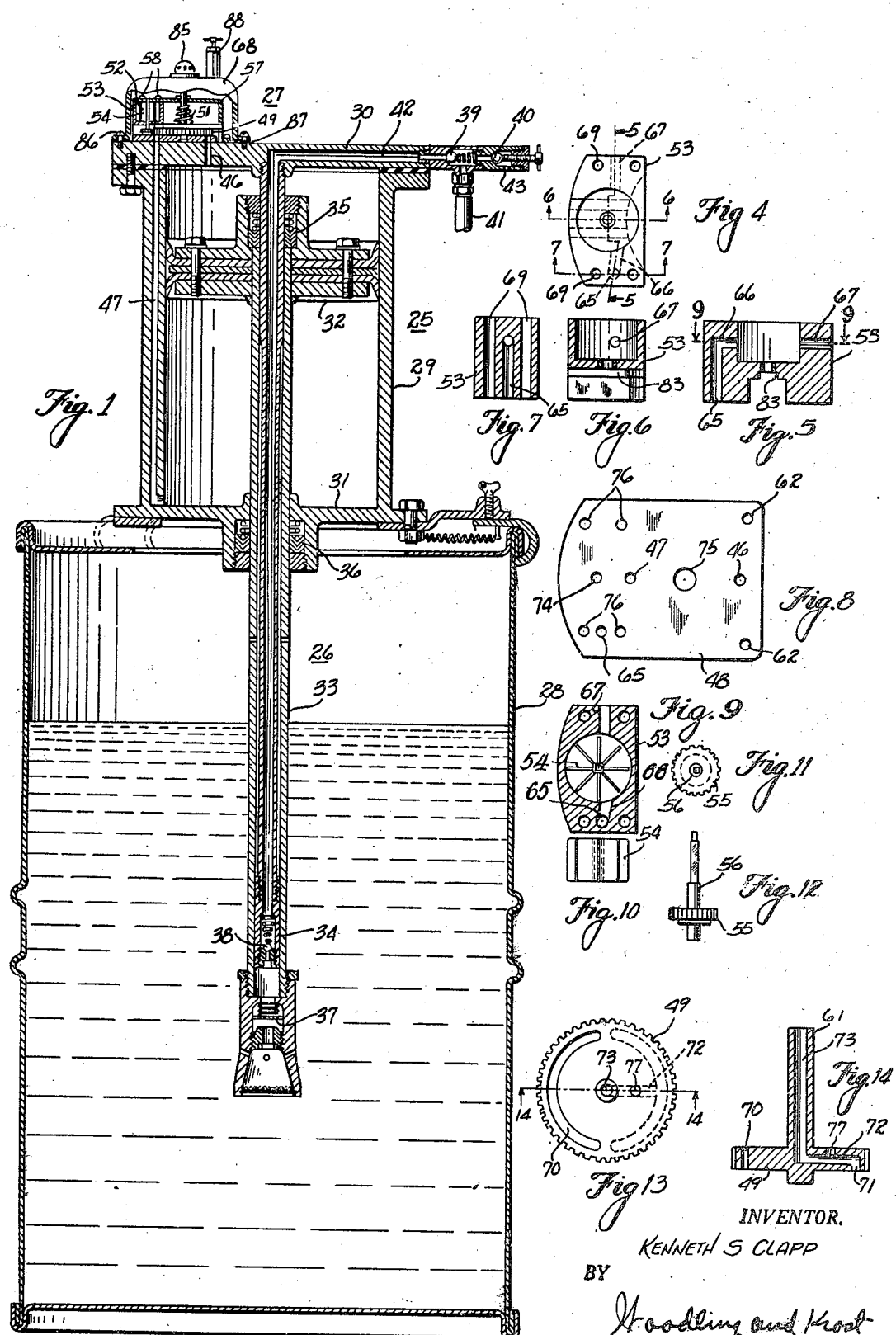
INVENTOR.
KENNETH S CLAPP
BY
Hoodling and Krost
attys Oct. 23, 1945.  K. S. CLAPP  2,387,234
FLUID CONTROL VALVE MECHANISM
Filed Jan. 29, 1943   2 Sheets-Sheet 2
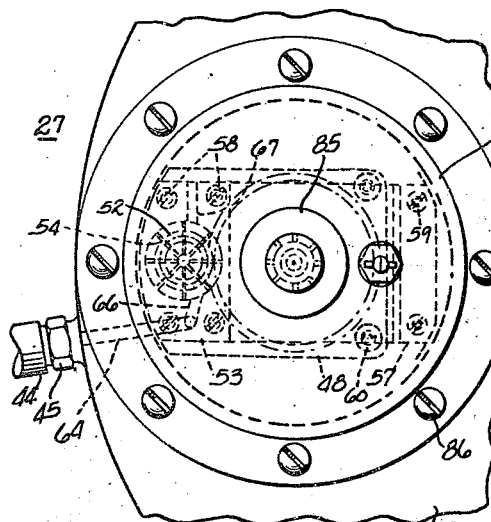
Fig. 3
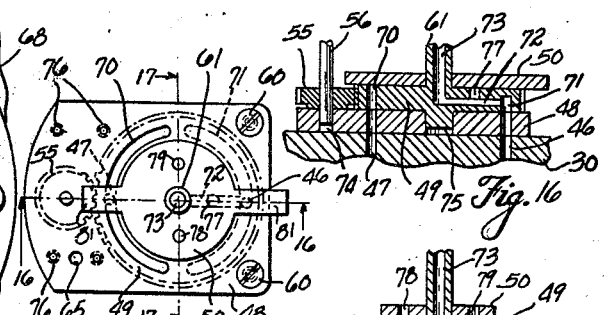
Fig. 15
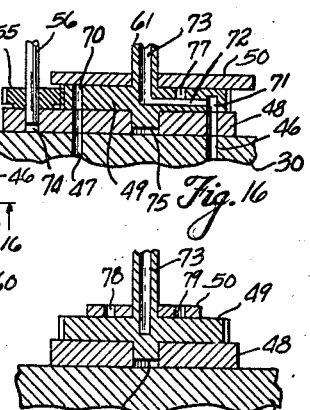
Fig. 16
Fig. 17
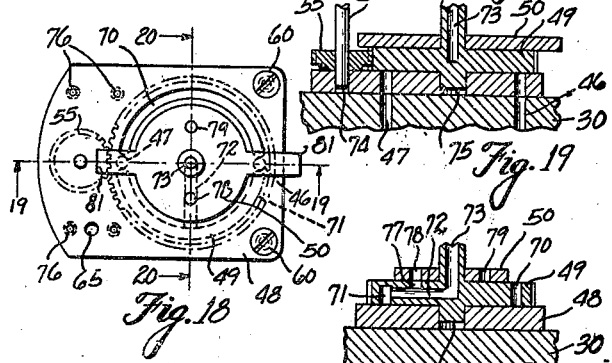
Fig. 18
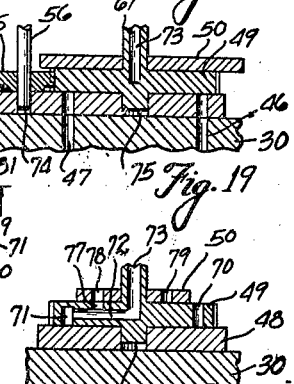
Fig. 19
Fig. 20
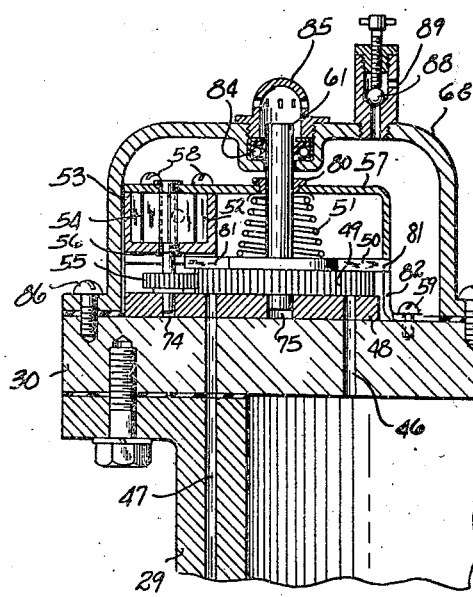
Fig. 2
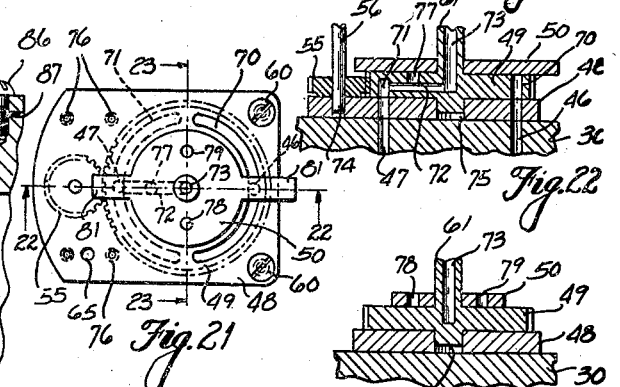
Fig. 21
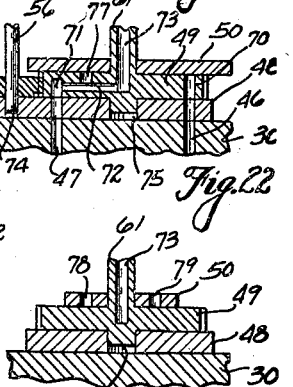
Fig. 22
Fig. 23
INVENTOR.
KENNETH S. CLAPP
BY
Stoodling and Kost attys Patented Oct. 23, 1945

2,387,234

UNITED STATES PATENT OFFICE 2,387,234

FLUID CONTROL VALVE MECHANISM

Kenneth S. Clapp, Shaker Heights, Ohio

Application January 29, 1943, Serial No. 473,976

12 Claims. (Cl. 121—147)

This invention relates to a control valve mechanism for automatically governing the movement of a reciprocating piston in a fluid motor pump. Fluid motors may comprise the rotary type or the reciprocating type and in this application my invention will be described as being applied to a reciprocating fluid motor, although my invention is not to be construed as being limited thereto.

A reciprocating fluid motor generally comprises a cylinder having a piston reciprocating inside the cylinder and may be employed to actuate a dispensing material pump for dispensing liquids, or viscous and semi-plastic materials. While my invention will be described with reference to a dispensing material pump, it is to be understood that my control valve mechanism may be employed to govern the movement of a fluid motor which may actuate devices other than a dispensing material pump.

The fluid, which supplies energy or movement to the piston, is usually compressed air, such compressed air being available in most places where pumps of this type are to be operated.

Fluid motor actuated piston pumps are chiefly used for dispensing lubricants, under high or low pressure, to the bearings and wearing parts of vehicles and machinery. However, pumps of this design and construction can also be used for dispensing putty, caulking compounds, sealing materials, and other viscous or semi-plastic materials.

The cylinder of a reciprocating motor has an orifice in its upper head and one in the lower head, so as to admit compressed air on one side of the piston and simultaneously exhaust the air on the opposite side of the piston. This requires a valve mechanism which performs four functions for automatic reciprocation of the fluid piston and which will be explained in more detail when giving a complete description of my invention.

All pumps of this class rely upon a mechanical connection between the movements of the fluid motor to actuate the fluid control valve mechanism when the fluid piston has reached either the top or bottom length of its stroke.

My invention completely divorces all mechanical and leverage actions between the fluid control valve mechanism and any moving parts of the fluid motor and pump. When a mechanical or leverage connection is used, the pump often stalls at the end of the top or bottom stroke because of wear in the mechanical connections or the loss of spring tension failing to move the control valve.

My invention shows an entirely new principle in the design and operation of a valve mechanism, which is economical to manufacture and positive in operation.

One of the main objects of my invention is the complete elimination of any mechanical connections or levers between the fluid motor or pump and the valve control mechanism.

Another object of my invention is to provide a continuous moving valve which is self cleaning and self-lapping.

Another object of my invention is the provision of operating the control mechanism by the fluid which drives the fluid motor.

Another object of my invention is the provision of actuating the control mechanism by a fluid under pressure.

Another object of my invention is to provide for the operation of a control valve mechanism by a pilot fluid motor.

Another object of my invention is the provision of a control valve mechanism in combination with a main fluid motor which governs the operation of the main fluid motor and which is propelled by a pilot fluid motor that receives energy from the same fluid that drives the main motor.

Another object of my invention is to provide a control valve mechanism, which receives motive energy from a pilot motor and which governs the operation of a main fluid motor, the valve mechanism by-passing the fluid from the main motor to atmosphere when the moving element of the main motor is arrested in order that the pilot motor may continue to receive motive energy from the in-coming fluid and continue to operate the valve mechanism.

Other objects of my invention will become more apparent after reviewal of all the component parts and their method of operation as set forth in the description and the claims taken in conjunction with the accompanying drawings, in which:

Figure 1 is a longitudinal side elevational view in cross-section of a control valve mechanism, in combination with a fluid operated motor and a dispensing material pump, embodying the features of my invention;

Figure 2 is an enlarged fragmentary cross-sectional view of the control valve mechanism for governing the reciprocal movements of the piston within the fluid motor;

Figure 3 is a plan view of the control valve mechanism shown in Figure 2;

Figure 4 is a plan view of the housing for a pilot fluid motor employed to drive the control valve mechanism;

Figures 5, 6 and 7 are cross-sectional views, respectively, taken along the lines 5—5, 6—6 and 7—7 of Figure 4;

Figure 8 is a plan view of a bottom stationary valve plate of the control valve mechanism;

Figure 9 is a cross-sectional view of the housing for the rotor in the pilot fluid motor that drives the control valve mechanism, taken along the line 9—9 of Figure 5, and illustrates in addition the rotor in the housing;

Figure 10 is a side elevational view of the rotor in Figure 9;

Figure 11 is a plan view of the pinion gear and shaft which is driven by the rotor of the pilot fluid motor and which drives the control valve mechanism;

Figure 12 shows a side elevational view of the pinion gear and shaft in Figure 11.

Figure 13 is a plan view of the gear driven rotary valve plate of the valve mechanism;

Figure 14 is a cross-sectional view of the gear driven rotary valve plate, taken along the line 14—14 of Figure 13;

Figure 15 is a plan view of the valve parts of my control valve mechanism showing the valve parts in the position where the bottom chamber of the cylinder for the main motor is connected to the fluid source and the top chamber is exhausting to atmosphere;

Figures 16 and 17 are cross-sectional views taken along the lines 16—16 and 17—17, respectively of Figure 15.

Figure 18 is a plan view of the valve parts, showing the valve parts in their neutral position where the movement of the fluid to the main motor is arrested and where the pilot fluid continues to receive by-passed fluid for continuously driving the control valve mechanism;

Figures 19 and 20 are cross-sectional views taken along the lines 19—19 and 20—20, respectively, of Figure 18;

Figure 21 is a plan view of the valve parts showing the position where the top chamber of the cylinder for the main motor is connected to the fluid source and the bottom chamber is connected to atmosphere; and Figures 22 and 23 are cross-sectional views taken along the lines 22—22 and 23—23, respectively, of Figure 21.

With reference to the drawings and particularly to Figures 1, 2 and 3, my fluid actuated valve mechanism is generally indicated by the reference character 27 and is arranged to govern the reciprocation of a main fluid motor 25 which is arranged to operate a dispensing material pump 26 inserted into a drum 28 supplied with the material to be dispensed. The main fluid motor 25 comprises generally a cylinder 29 having a top head 30 and a bottom head 31 within which reciprocates a piston 32 which reciprocally actuates a dispensing pump cylinder 33 in the material to be dispensed. As illustrated, a dispensing pump piston 34 is securely attached to the top head 30 and is provided with a longitudinal bore which in conjunction with a horizontal duct 42 in the top head 30 conveys material to the discharge hose 41. A manual ball release valve 40 is used to bleed air through a vent 43 from the discharged material, should the material pump become airbound after the material is exhausted in the drum. Conventional intake and discharge valves for controlling the inlet of materials to the dispensing pump and the discharge of said materials are shown as 37, 38 and 39. A piston packing seal 35 is provided around the stationary piston shaft of the dispensing pump to prevent the motive fluid from escaping from the top cylinder chamber of the main motor and a packing 36 is employed in the bottom head 31 to prevent the motive fluid from escaping from the bottom cylinder chamber of the main fluid motor. The construction and operation of my main fluid motor 25 and the dispensing pump 26 is substantially the same as that shown and described in my pending patent application for Dispensing pump, filed on the 28th of January, 1943, Serial No. 473,797.

The fluid under pressure, such for example as compressed air, is supplied by an inlet hose 44 and enters through a hose fitting 45 into the valve chamber housing 68 which encloses my control valve mechanism 27, and from there the air enters the main fluid motor as directed by my control valve mechanism 27. The compressed air upon leaving the hose fitting 45 is directed to drive a pilot fluid motor 52 before passing into the valve chamber housing 68. The pilot fluid motor 52 comprises generally a housing block 53 having a rotor 54 therein and driven by the compressed air which enters the valve chamber housing 68. The housing block 53 is shown in Figures 4 to 7, inclusive, and Figure 9. As shown in Figure 9, a clearance is provided between the tips of the rotor vanes and the inside wall of the housing in which it rotates. The air after leaving the hose fitting 45 is directed to the pilot fluid motor 52 through the following passages; namely, a horizontal duct 64 in the top head 30 of the main fluid motor, a vertical duct 65 in the pilot housing block 53, and a horizontal duct 66 in the pilot housing block 53. The compressed air upon contacting the vanes of the rotor 54 causes the same to rotate in a counter-clockwise direction in Figure 9, after which the air flows around the inside wall of the housing, where it then exhausts through an exhaust duct 67 into the valve chamber housing 68 which is secured to the top head 30 of the main fluid motor by means of screws 86 between which a gasket 87 is interposed to prevent leakage of the compressed air.

The rotor 54 of the pilot fluid motor 52 is arranged to drive a pinion shaft 56 which has a pinion 55 secured to the lower portion thereof. The lower end of the pinion shaft 56 fits in a bearing hole 74 in the bottom stationary valve plate 48. As illustrated, the pinion 55 is arranged to rotate the rotary valve plate 49 which is interposed between the bottom stationary valve plate 48 and the top non-rotating valve plate 50. The rotary valve plate 49 is provided around its periphery with gear teeth which match the gear teeth of the pinion 55 whereby the rotation of the rotor 54, as driven by the compressed air, rotates the rotary valve plate 49 to control the flow of the air to and from the main fluid motor 25 through ducts 46 and 47 for producing a reciprocal movement to the piston 32. The engaging valve surfaces of the plates are lapped to provide a perfect seal and they are held flat against each other by means of a spring 51 which presses the parts closely together. The upper end of the spring 51 rests underneath a bracket 57 having the left-hand end thereof connected to the pilot fluid motor housing block 53 by means of screws 58 and having its right-hand end thereof connected to the top head 30 of the main motor by means of screws 59. The screws 58 which hold the bracket 57 to the pilot fluid motor housing 53 extend down through screw holes 69 in the said block, thence through openings 76 in the the movable element of the control valve is driven by a pilot fluid motor which receives energy by the same fluid that drives the fluid motor. The valve parts also provide for by-passing the fluid through the pilot fluid motor to atmosphere when the movement of the fluid to the main motor is arrested.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A fluid motor having a piston reciprocally mounted within a cylinder, a valve mechanism governing the reciprocation of said piston, said valve mechanism being actuated by the fluid which reciprocates the said piston, said valve mechanism having by-pass means to vent fluid to atmosphere for permitting said valve mechanism to continue to be actuated by said fluid when the flow of fluid to said piston is arrested by said valve mechanism.

2. A motor actuated by compressed air, said motor having a movable element, said movable element being propelled by said compressed air, a valve mechanism for controlling the operation of said movable element, said valve mechanism being actuated by the said compressed air, said valve mechanism having by-pass means to vent compressed air to atmosphere for permitting said valve mechanism to continue to be actuated by said compressed air when the flow of compressed air to said movable element of the motor is arrested by said valve mechanism.

3. A control valve for directing fluid to a fluid motor, said fluid motor having a fluid actuated movable part, said control valve being operated by the fluid of said fluid motor and controlling the operation of said movable part, said control valve having by-pass means to vent fluid to atmosphere for permitting said control valve to continue to be actuated by said fluid when the flow of fluid to said movable part of the fluid motor is arrested by said control valve.

4. A control valve for controlling the flow of fluid to a moving part of a fluid motor, said control valve having ports for directing the fluid to and from the fluid motor, and said valve being actuated by the fluid which operates said fluid motor and being entirely divorced from mechanical connection with said moving part of said fluid motor, said control valve having by-pass means to vent fluid to atmosphere for permitting said control valve to continue to be actuated by said fluid when the flow of fluid to said movable part of the fluid motor is arrested by said control valve upon the closure of a valve port thereof.

5. Fluid actuated control valve means for regulating the movement of a fluid motor, said motor having a reciprocating piston located within a cylinder, said control valve being actuated by the same fluid that moves the piston, said control valve having by-pass means to vent fluid to atmosphere for permitting said control valve to continue to be actuated by said fluid when the flow of fluid to said piston is momentarily arrested by said control valve during the interval the control valve is reversing the direction of the flow of fluid to and from opposite sides of said piston.

6. Fluid actuated control valve means for regulating the movement of a main fluid motor, said control valve means comprising a movable valve part for directing the flow of fluid to the main motor, and a pilot fluid motor having speed reducing means for actuating the movable valve part at a slower speed than the speed of the pilot fluid motor, said control valve means having by-pass means to vent fluid to atmosphere for permitting said pilot fluid motor to continue to be actuated by said fluid for actuating the control valve means when the flow of fluid to said fluid motor is arrested by said control valve means.

7. Fluid actuated control valve means for regulating the movement of a main fluid motor, said control valve means comprising a movable valve part for directing the flow of fluid to the main motor, and a pilot fluid motor for actuating the movable valve part, said pilot fluid motor receiving energy by the same fluid that drives the fluid motor, speed reducing means interconnecting the pilot fluid motor and the movable valve part to operate the movable valve part at a slower speed than the speed of the pilot fluid motor, said control valve means having by-pass means to vent fluid to atmosphere for permitting said control valve to continue to be actuated by said fluid when the flow of fluid to said fluid motor is arrested by said control valve.

8. Fluid actuated control valve means for regulating the movement of a main fluid motor, said control valve means comprising a movable valve part for directing the flow of fluid to the main motor, and a pilot fluid motor for actuating the movable valve part, said pilot fluid motor receiving energy and being driven by the same fluid that drives the fluid motor, said control valve means also having means for by-passing the fluid to atmosphere whereby said fluid motor continues to be driven by said fluid when the movement of the fluid to the main motor is arrested.

9. A rotary valve mechanism for directing the flow of compressed air to and from the opposite sides of a reciprocating piston, said rotary valve mechanism comprising a movable valve part, a pilot fluid motor for actuating the movable valve part, said pilot fluid motor being actuated by the same fluid that actuates the said piston, said rotary valve mechanism having by-pass port means to vent compressed air to atmosphere for permitting said pilot fluid motor to continue to be actuated by said compressed air and drive said movable valve part when the flow of compressed air to said piston is momentarily arrested by said rotary valve mechanism during the interval that the rotary valve mechanism is reversing the direction of the flow of compressed air to and from opposite sides of said piston.

10. A valve for directing a pressure fluid to and from the opposite ends of a fluid piston motor, a pressure chamber enclosing said valve, a pilot motor having a housing with an opening and a shaft extending through said opening, said shaft being connected to drive said valve and extending into said pressure chamber, the opening in the pilot motor housing through which the shaft extends being in communication with said pressure chamber, the pressure fluid passing through the pilot motor and into said pressure chamber, said valve having by-pass means to vent the pressure fluid to atmosphere from said pressure chamber for permitting the pilot motor and the valve driven thereby to continue to be actuated by said fluid when the flow of the fluid stationary bottom valve plate 48 and then threadably engage the top head 30 of the main motor. The right-hand end of the bottom stationary valve plate 48 is anchored to the top head 30 by means of screws 60 which pass through openings 62. The non-rotating valve plate 50 is provided upon each end thereof with ears 81 which are adapted to fit within vertical slots 82 and 83 so as to compensate for any wear of the valve parts. The vertical slot 82 is provided in the leg of the bracket 57 and the vertical slot 83 is provided in the pilot fluid motor housing block 53, see Figure 5. The gear driven rotary valve plate 49 is provided with a stem 60 having the lower end portion fitting in a bearing hole 75 in the bottom stationary valve plate 48. The upper portion of the stem is vertically supported by a bushing 80 carried by the bracket 57.

In operation when compressed air enters the valve chamber housing 68 it causes the rotor 54 of the pilot fluid motor to rotate the gear driven rotary valve plate 49 between the bottom stationary valve plate 48 and the non-rotating valve plate 50. The rotary valve plate 49 is provided with an arcuate groove 71 of approximately 170 degrees which is connected to atmosphere through a valve exhaust conduit 72 and a valve stem exhaust duct 73. The other side of the gear driven rotary valve plate 49 is provided with an arcuate slot 70 of approximately 170 degrees which provides communication from the valve chamber housing 68 alternately to the bottom and top chambers of the main fluid motor 25 by air ducts 46 and 47 for reciprocating the piston 32 therein. The two air ducts 46 and 47 provided in the bottom stationary valve plate 48 and the top head 30 of the main fluid motor are spaced approximately 180 degrees apart, the duct 46 connecting the valve chamber housing 68 to the upper chamber of the main fluid motor and the duct 47 connecting the valve chamber housing 68 to the bottom chamber of the main fluid motor. These ducts 46 and 47 are maintained in communication with the compressed air or atmosphere except when the rotary valve plate 49 blanks both ducts 46 and 47 with the partition between the adjacent ends of the slot 70 and the groove 71 which partition may represent approximately 10 degrees. When the compressed air is blanked as provided by the partitions, the pilot fluid motor 52 would then cease to rotate since there would be no flow of the air causing rotation of the rotor 54. In order to eliminate a stoppage of the valve rotation at this portion of the cycle, I provide two small by-passed vents 78 and 79 in the non-rotating valve plate 50 which are spaced approximately 180 degrees apart and about 90 degrees with respect to the ducts 46 and 47. The valve exhaust conduit 72 is provided with a conduit orifice 77 which when the gear driven rotor valve plate 49 revolves registers with either one of the two by-passing vents 78 or 79 when the partitions of the rotor valve plate 48 between the ends of the arcuate valve slot and the arcuate valve groove blank the ducts 46 and 47, so that the air in the valve chamber housing 68 may be vented to atmosphere in order to eliminate a stoppage of the rotation of the rotor 54 of the pilot fluid motor. In other words, the by-passing vents 78 and 79 and the conduit orifice 77 provide for bleeding the air when the movement of the air is arrested to the main fluid motor. The bleeding of the compressed air through either one of the by-passing vents 78 or 79 and the registering conduit orifice 77 provide for the continuous rotation of the pilot fluid motor 52 and the gear driven rotary valve plate 49 until air again flows to the main fluid motor 25 through the arcuate valve slot 70 of the rotary valve plate 49.

The Figures 15, 16 and 17 show the position of the gear driven rotary valve plate 49 for admitting compressed air through the duct 47 to the bottom chamber of the main fluid motor 25 and for simultaneously exhausting air from the upper chamber through the duct 46, the arcuate valve groove 71, the valve exhaust conduit 72 and the valve stem exhaust duct 73. The Figures 18, 19 and 20 represent the neutral position of the valve parts and show the ducts 46 and 47 blanked by the partitions in the rotor valve plate 48 between the ends of the arcuate valve seat 70 and the arcuate valve groove 71 which would normally cause the rotor 54 of the pilot fluid motor 52 to stop, but as explained before, I provide for bleeding or by-passing the fluid from the valve chamber housing 68 to cause continued rotation of the rotor 54 even though the movement of the air to the main fluid motor 25 is arrested. As shown in Figure 20, the compressed air in the valve chamber housing 68 is bled to atmosphere through the by-pass vent 78, the registered conduit orifice 77, the valve exhaust conduit 72 in the gear driven rotary valve plate 49 and thence through the valve stem exhaust duct 73 to atmosphere. The Figures 21, 22 and 23 show the valve parts in a reverse position from the position of the parts shown in Figures 15, 16 and 17, respectively. In Figures 21, 22 and 23 the air flows from the valve chamber housing 68 through the arcuate valve slot 70 and into the duct 47 to the bottom chamber of the main fluid motor 25 to raise the piston 32 while the fluid from the upper part of the main fluid motor simultaneously exhausts through duct 46, the arcuate valve groove 71, the valve exhaust conduit 72, and the valve stem exhaust duct 73 to atmosphere. The valve stem exhaust duct 73 terminates within an exhaust shield 85 provided externally of the valve chamber 68 to prevent foreign matter from entering the valve passages. The upper end portion of the valve stem 60 is sealed by means of a rod seal 84 to keep the compressed air within the valve chamber housing 68 from escaping to atmosphere.

In the event the main fluid motor piston 32 should fail to reciprocate because of a blocking of material in the discharge hose or for any other cause, air bleeder valve 88 is positioned in valve chamber housing 68 for manual bleeding of the fluid through vent 89. This operation assures a new supply of fluid to contact rotor 54, which resumes rotation of rotary valve plate 49.

The stroke of the piston of the main motor may be variable depending upon the conditions of operation. For ordinary operation, the stroke is relatively short as compared to the length of the main cylinder, to insure ample end clearances between the piston and the cylinder heads so that in no event will the piston strike the cylinder head before one complete one-half revolution of the rotary valve is made. In other words, the cubic foot displacement of the fluid to make a complete one-half revolution of the rotary valve is less than that required to force the piston of the main motor one full length stroke of the cylinder.

Summarizing, it is to be noted that I have invented a fluid actuated control valve for regulating the movement of a main fluid motor when from the pressure chamber to the piston motor is arrested by said valve.

11. A valve control mechanism for directing the flow of fluid to and from opposite fluid chambers of a fluid motor comprising a fluid pressure housing, a first stationary valve plate in the housing having at least two ducts disposed substantially 180 degrees apart for respectively providing communication to the opposite fluid chambers of the motor, a rotary valve plate resting against the first stationary valve plate and having an arcuate fluid communication extending substantially 170 degrees therearound to provide alternate fluid communication from the fluid pressure housing to the two ducts and the opposite fluid chambers of the motor, said rotary valve plate also having an arcuate groove extending substantially 170 degrees therearound next adjacent to the first stationary valve plate and having inwardly directed communicating means connecting the arcuate groove to atmosphere, which in turn provides alternate communication from the two ducts and the opposite fluid chambers of the motor to atmosphere, a second stationary valve plate resting against the opposite side of the rotary valve plate from the first stationary valve plate, said second stationary valve plate having two openings extending therethrough and disposed substantially 180 degrees apart with respect to each other and substantially 90 degrees apart from the two ducts, said rotary valve plate having a by-pass orifice extending from the inwardly directed communicating means and registering with the two openings of the second stationary valve plate upon the rotation of the rotary valve plate.

12. A valve control mechanism for directing the flow of fluid to and from opposite fluid chambers of a fluid motor comprising a fluid pressure housing, a first stationary valve plate in the housing having at least two ducts disposed substantially 180 degrees apart for respectively providing communication to the opposite fluid chambers of the motor, a rotary valve plate resting against the first stationary valve plate and having an arcuate fluid communication extending substantially 170 degrees therearound to provide alternate fluid communication from the fluid pressure housing to the two ducts and the opposite fluid chambers of the motor, said rotary valve plate also having an arcuate groove extending substantially 170 degrees therearound next adjacent to the first stationary valve plate and having inwardly directed communicating means connecting the arcuate groove to atmosphere, which in turn provides alternate communication from the two ducts and the opposite fluid chambers of the motor to atmosphere, a second stationary valve plate resting against the opposite side of the rotary valve plate from the first stationary valve plate, said second stationary valve plate having two openings extending therethrough and disposed substantially 180 degrees apart with respect to each other and substantially 90 degrees apart from the two ducts, said rotary valve plate having a by-pass orifice extending from the inwardly directed communicating means and registering with the two openings of the second stationary valve plate upon the rotation of the rotary valve plate, a pilot fluid motor for driving the rotary valve plate, the pressure fluid passing through the pilot motor and into the fluid pressure housing.

KENNETH S. CLAPP.